United States Patent
Toyoda

[19]

[11] Patent Number: 6,045,199

[45] Date of Patent: *Apr. 4, 2000

[54] BRAKE VALVE CONTROL METHOD

[75] Inventor: Keiji Toyoda, Hamakita, Japan

[73] Assignee: Nisshinbo Industries Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/879,141

[22] Filed: Jun. 19, 1997

[30] Foreign Application Priority Data

Jun. 20, 1996 [JP] Japan .................................. 8-179908

[51] Int. Cl.$^7$ ...................................................... B60T 8/34
[52] U.S. Cl. ............... 303/159; 303/122.06; 303/122.07; 303/156; 303/168; 701/76
[58] Field of Search .............................. 303/20, 153, 156, 303/157, 158, 159, 167, 168, 171, 173, 174, 176, 199, 170, 122.07, 122.05, 122.06; 188/181 A, 181 C; 701/70, 78, 76; 364/528.39; 324/166

[56] References Cited

U.S. PATENT DOCUMENTS 4,669,046   5/1987   Kubo .................................. 303/122.07

*Primary Examiner*—Douglas C. Butler
*Attorney, Agent, or Firm*—Arent fox Kintner Plotkin & Kahn

[57] ABSTRACT

A brake valve control method to control the operation of the brake valves is provided in which an error check can be made with one arithmetic logic unit. Signals from a wheel speed sensor are processed to compute the respective wheel speed, and signals from the wheel speed sensor are counted for a prescribed period to derive an approximate wheel speed. If the difference between the wheel speed and the approximate wheel speed is less than or equal to a threshold value, then processing to control the valves is continued; if the difference is greater than a threshold value, then processing to control the valves is suspended.

4 Claims, 4 Drawing Sheets

BRAKE VALVE CONTROL METHOD

BACKGROUND OF THE INVENTION

This invention relates to a method for controlling the valves used for braking a vehicle.

Conventionally, an arithmetic logic unit (ALU) is used to control the operation of the brake valves. A check of ALU processing errors is performed by a plural number of ALUs. For example, the same data is processed by several ALUs, and the output results are compared. ALU processing errors are then checked by the agreement or disagreement among the results of the various ALUs. Accordingly, the conventional method for checking processing errors in the control of brake valves requires the installation of a plural number of ALUs.

This invention provides a method for controlling the valves for braking a vehicle in which the same ALU that controls the valves also performs an error check.

This invention provides certain particular advantages. A comparative processing for an error check is performed using logic different from that used for the main processing to control the brake valves. This enables a single ALU to detect errors in the main processing. Processing of the comparative check has been simplified with no division operations, thus reducing the processing burden on the ALU. Processing of the comparative check has been simplified with no division operations, thus greatly reducing the potential for errors. Valve control is performed with a single ALU which makes the brake control device smaller and cheaper.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

A preferred embodiment of the invention is explained next with reference to the diagrams.

Figure 1:
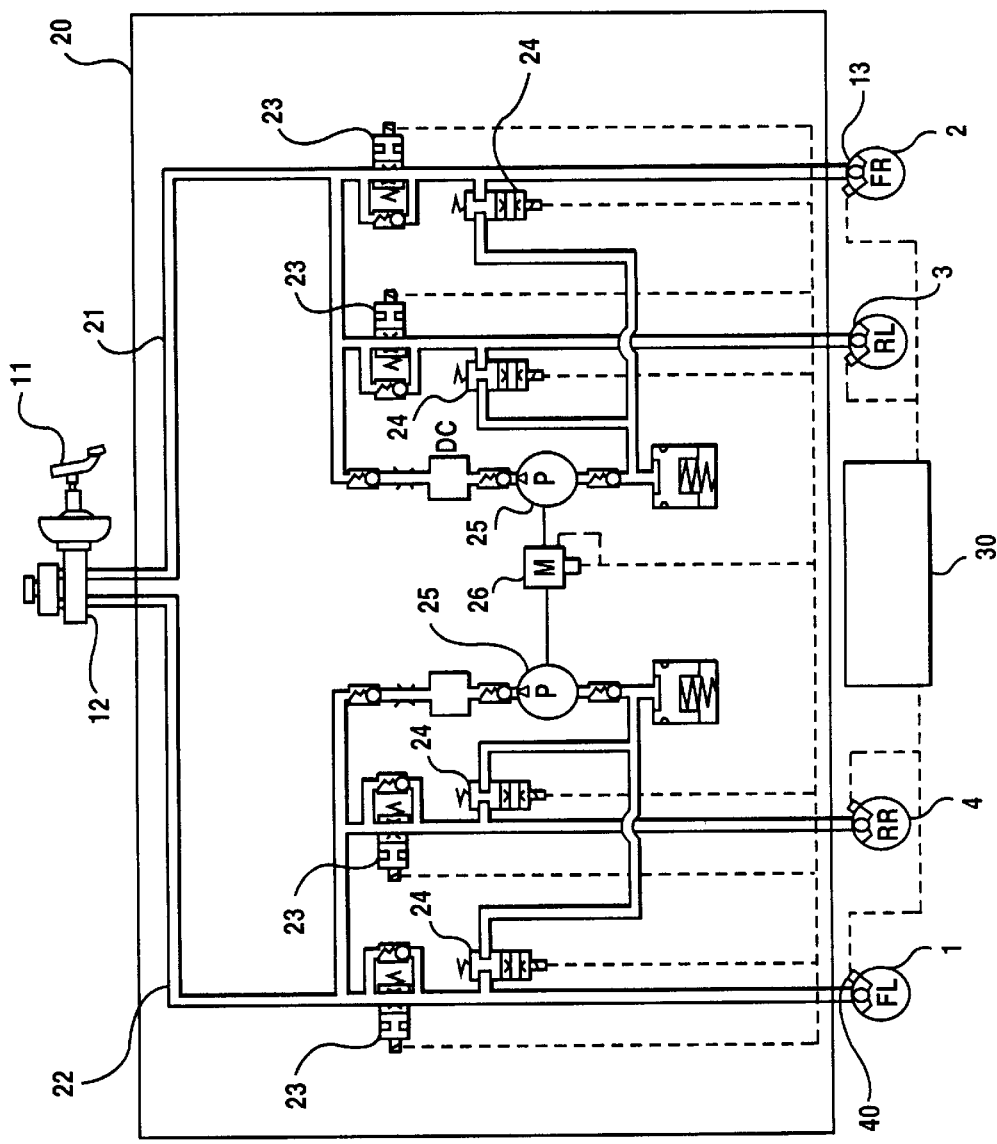
FIG. 1 is an overview of an antilock brake control device.
Figure 2:
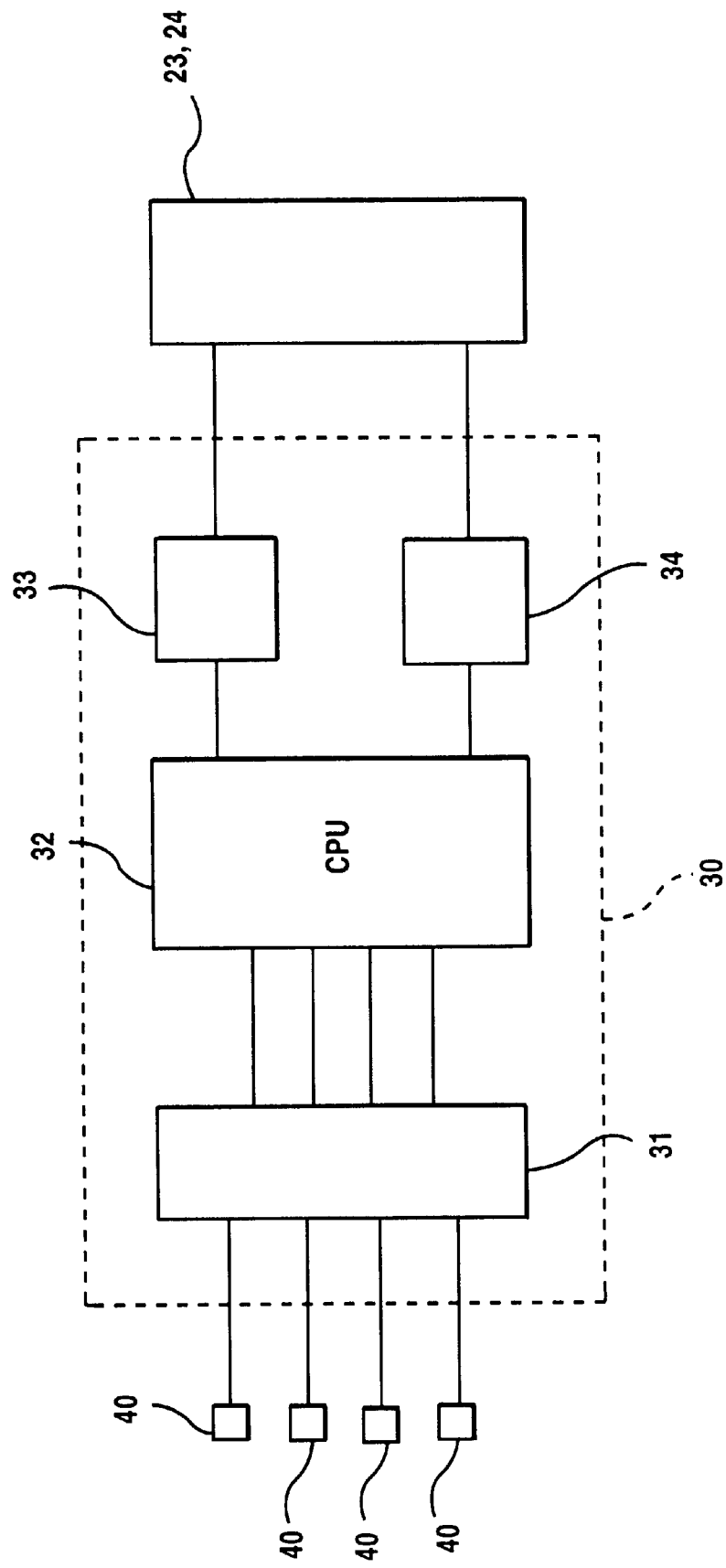
FIG. 2 is an overview of the electronic control unit of an antilock brake control device.

An example of an antilock control (ABS) device that controls the inlet valve 23 and outlet valve 24 is illustrated in FIG. 1. During normal braking, when the driver steps on the brake pedal 11, brake pressure generated at the master cylinder 12 is applied to the inlet valve 23 installed in the first brake line 21 or the second brake line 22 (connecting the wheels in an X configuration) inside the ABS hydraulic pressure unit 20, and acts on the respective wheel cylinder 13 of each wheel 1–4 to brake the vehicle.

During an antilock operation, the electronic control unit 30 obtains signals from the respective wheel speed sensor 40 of each wheel 1–4 to determine the state of slippage of each wheel from its speed. It then turns the motor 26 to drive the hydraulic pump 25 to return brake fluid to the first brake line 21 and the second brake line 22 via the dumping chamber DC and the check valve. At the same time, it also opens and closes each inlet valve 23 and outlet valve 24 to suitably increase or decrease the brake pressure to the respective wheel cylinder 13 of each wheel 1–4 to prevent it from locking.

The valve control method of this invention is not restricted to an ABS device, and can be applied as well to control the valves, for example, of a traction control device.

Figure 3:
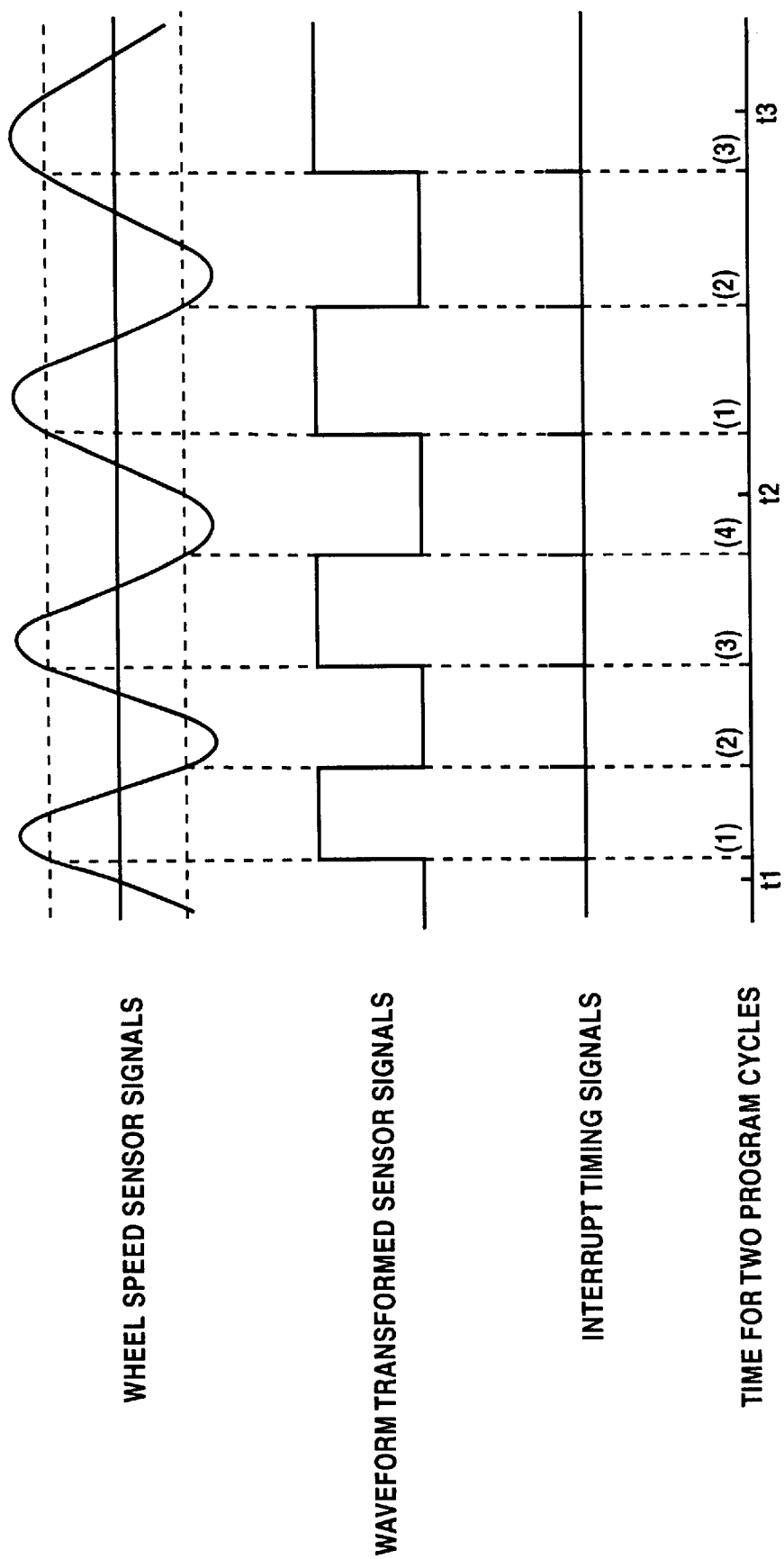
FIG. 3 illustrates the waveforms of the wheel speed sensor signals.
Figure 4:
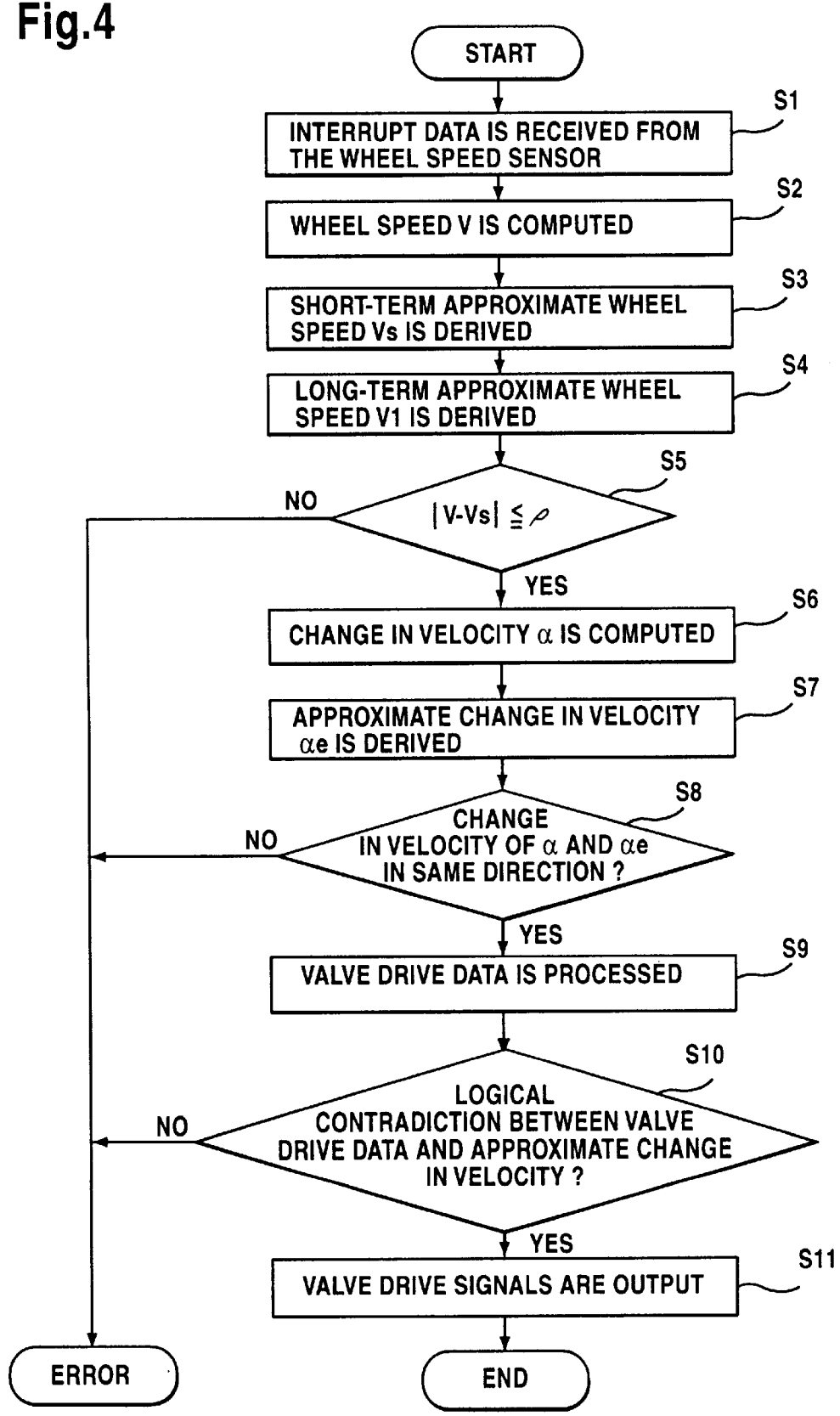
FIG. 4 is a flow chart of the processing steps to control the brake valves.

The electronic control unit 30, as shown in FIG. 3, uses the waveform transformation circuit 31 to transform the waveform of the signals from the wheel speed sensor 40 of each wheel; uses the ALU 32 (CPU) to compute the wheel speed, change in velocity α, probable vehicle speed, slip ratio, and other variables; processes and outputs the valve drive data to control the brake valves; and uses the valve drive circuit 33 to output the signals to drive the inlet valve 23, outlet valve 24, and other valves. It also uses the valve drive monitor circuit 34 to monitor the signals from the inlet valve 23 and outlet valve 24 and checks the drive state of the valves with the ALU 32.

The waveform of the signals from a wheel speed sensor is transformed by the waveform transformation circuit as shown in FIG. 3. The leading edge and the trailing edge of the transformed signal creates the interrupt timing signals.

Computation of wheel speed and change in velocity thereof is performed. A wheel speed V can be computed by a variety of methods. For example, the number of interrupts N of the wheel speed sensor is derived for a given time period T, and the wheel speed V can be computed from the distance L traveled by the circumference of the wheel per interrupt, using Formula 1. The change in velocity α of said wheel can be computed from the change in the wheel speed V as a function of time, using Formula 2. These computations are performed by division and many other arithmetic operation routines of the ALU.

Formula 1

$$V = \frac{L \times N}{T},$$

where

V Wheel speed

L Distance covered by circumference of wheel per interrupt

N Number of interrupts

T Time period for measurement of number of interrupts

Formula 2

$$\alpha = \frac{V - Vd}{\delta t},$$

where

α Change in velocity

V Wheel speed

Vd Wheel speed after time period δt

δt Short time period

Derivation of approximate wheel speed and approximate change in velocity is performed. An approximate wheel speed is derived with minimal use of the ALU from a table of wheel speeds which are predetermined for a given number of interrupts within a prescribed time period, an example of which is shown in Table 1. This table has two types of approximate wheel speeds, a short-term approximate wheel speed Vs and a long-term approximate wheel speed Vl, but any number of approximate wheel speeds can be derived for a corresponding number of prescribed time periods.

TABLE 1

| No. of Interrupts | Short-term Approximate Wheel Speed (km/hr) | Long-term Approximate Wheel Speed (km/hr) |
|---|---|---|
| 1 | 2.5 | 0.5 |
| 4 | 17.5 | 3.5 |
| 10 | 47.5 | 9.5 |
| . | . | . |

For the short-term approximate wheel speed Vs, the number of interrupts of a wheel speed sensor is counted for a short time period, for example, the time for two program cycles, and the corresponding approximate speed can be derived from the number of interrupts and the table. For example, for one interrupt, the short-term approximate wheel speed is 2.5 km/hr, and for four interrupts, the short-term approximate wheel speed is 17.5 km/hr.

For the long-term approximate wheel speed V1, the number of interrupts of a wheel speed sensor is counted for a long time period, for example, the time for 10 program cycles, and the corresponding approximate speed can be derived from the number of interrupts and the table. For example, for one interrupt, the long-term approximate wheel speed is 0.5 km/hr, and for four interrupts, the long-term approximate wheel speed is 3.5 km/hr.

The direction of an approximate change in velocity $\alpha e$ can be determined from the difference between the short-term approximate wheel speed Vs and the long-term approximate wheel speed V1. That is, the short-term approximate wheel speed Vs and the long-term approximate wheel speed V1 can be constantly updated, in which case Vs and V1 can be compared for any arbitrary number of program cycles. Moreover, since a portion of the measured time period will inevitably overlap if a comparison is made for an arbitrary number of program cycles, then the direction of the approximate change in velocity $\alpha e$ can be determined from Formulas 3–5. That is, if the condition of Formula 3 is satisfied, then the direction of the approximate change in velocity $\alpha e$ is that of deceleration; if Formula 4 is satisfied, then the direction of the approximate change in velocity $\alpha e$ is that of constant velocity; and if Formula 5 is satisfied, then the direction of the approximate change in velocity $\alpha e$ is that of acceleration.

Formula 3

$$V1-VS > \epsilon, \text{ where}$$

V1 Long-term approximate wheel speed
Vs Short-term approximate wheel speed
$\epsilon$ Prescribed value (positive number)

Formula 4

$$|V1-VS| \leq \epsilon$$

Formula 5

$$V1-Vs < -\epsilon$$

Next, an example of the processes to control the brake valves is explained.

| | |
|---|---|
| S1 | Interrupt data is received from the wheel speed sensor. |
| S2 | A wheel speed V is computed from the interrupt data using Formula 1. |
| S3 | A short-term approximate wheel speed Vs is derived from the interrupt data and Table 1. |
| S4 | A long-term approximate wheel speed V1 is derived from the interrupt data and Table 1. |
| S5 | The wheel speed V and the approximate wheel speed, for example, the short-term approximate wheel speed Vs, is compared, and if the difference is greater than the threshold value p, an ALU processing error is assumed and processing to drive the valves is suspended. |
| S6 | If the difference in S5 is equal to or less than a threshold value p, the change in velocity $\alpha$ is computed from Formula 2. |
| S7 | The direction of the approximate change in velocity $\alpha e$ is determined from Formulas 3–5. |
| S8–S9 | The direction of the change in velocity $\alpha$ is compared to the direction of the approximate change in velocity $\alpha e$ using Table 2. If the directions differ, an ALU processing error is assumed, and processing to drive the valves is suspended. If the directions are the same, the data to drive the valves is processed. |

In other words, as shown in Table 2, if the change in velocity $\alpha$ and the approximate change in velocity $\alpha e$ are both in the direction of acceleration, then there is no processing error and data to drive the valves is processed. If the change in velocity $\alpha$ is in the direction of acceleration but the approximate change in velocity $\alpha e$ is in the direction of deceleration or of constant velocity, then there is a processing error and the processing to drive the valves is suspended.

| | |
|---|---|
| S10–S11 | The valve drive data is compared logically with the approximate change in velocity $\alpha e$. If there is a contradiction between the two patterns, a processing error is assumed, and processing of data to drive the valves is suspended. If there is no contradiction, signals to drive the valves are output to control the operation of the valves. |

For example, suppose during an antilock control operation, the slip ratio is larger than its threshold value and the deceleration of a wheel is larger than its threshold value, and these states continue or become even greater. In this case, the valve control is in a pattern to reduce the brake pressure. But if the approximate change in velocity $\alpha e$ is in a pattern to increase the brake pressure, then there is a contradiction between the two patterns, and control of the valves is suspended. Conversely, suppose the slip ratio is smaller than its threshold value and the change in velocity $\alpha$ is larger than its threshold value, and these states continue or are reinforced. In this case, the valve control is in a pattern to increase the brake pressure. But if the approximate change in velocity $\alpha e$ is in a pattern to reduce the brake pressure, then again there is a contradiction between the two patterns, and processing to drive the valves is suspended.

TABLE 2

| Direction of change in velocity $\alpha$ | Direction of approximate change in velocity $\alpha e$ | Data to drive valves is processed? |
|---|---|---|
| Acceleration | Acceleration | Yes |
| Acceleration | Constant velocity or deceleration | No |
| Constant velocity | Constant velocity | Yes |
| Constant velocity | Acceleration or deceleration | No |

TABLE 2-continued

| Direction of change in velocity α | Direction of approximate change in velocity αe | Data to drive valves is processed? |
|---|---|---|
| Deceleration | Deceleration | Yes |
| Deceleration | Constant velocity or acceleration | No |

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A brake valve control method comprising inputting and processing signals from plural wheel speed sensors by an arithmetic logic unit to control plural respective brake valves of a vehicle, said processing including computing respective wheel speed using signals from a wheel speed sensor, deriving a direction of a change of computed velocity, counting signals from said wheel speed sensor for a short prescribed time period and deriving an short-term approximate wheel speed corresponding to a first count value, counting signals from said wheel speed sensor for a long prescribed time period and deriving a long-term approximate wheel speed corresponding to a second count value, and deriving a direction of an approximate change in velocity from said short-term approximate wheel speed and said long-term approximate wheel speed; wherein if the direction of the computed change in velocity is the same as the direction of the approximate change in velocity, then processing to control the valves is continued; and if the direction of the computed change in velocity differs from the direction of the approximate change in velocity, then processing to control the valves is suspended.

2. A brake valve control method comprising inputting and processing signals from plural wheel speed sensors by an arithmetic logic unit to control plural respective brake valves of a vehicle, said processing including computing respective wheel speed using signals from a wheel speed sensor, counting signals from said wheel speed sensor for a short prescribed time period and deriving an short-term approximate wheel speed corresponding to a first count value, counting signals from said wheel speed sensor for a long prescribed time period and deriving a long-term approximate wheel speed corresponding to a second count value, and deriving a direction of an approximate change in velocity from said short-term approximate wheel speed and said long-term approximate wheel speed, and logically comparing a control pattern of the valve control signals to a pattern of the approximate change in velocity; wherein if there is no contradiction between the control pattern of the valve control signals and the pattern of the approximate change in velocity, then processing to control the valves is continued; and if there is a contraction between the control pattern of the valve control signals and the pattern of the approximate change in velocity, then processing to control the valves is suspended.

3. A brake valve control method comprising:

(A) inputting and processing signals from plural wheel speed sensors by an arithmetic logic unit to control plural respective brake valves of a vehicle, said processing including computing respective immediate wheel speed using signals from a wheel speed sensor;

(B) concurrently to said inputting and processing, counting said signals from the wheel speed sensor for a prescribed time period and simultaneously deriving an approximate wheel speed corresponding to the count value; wherein if the difference between said immediate wheel speed and said approximate wheel speed is less than or equal to a prescribed threshold value, then processing to control the valves is continued; and if the difference is greater than said threshold value, an error in said processing is assumed and then said processing to control the valves is suspended.

4. The brake valve control method of claim 3, further comprising storing a plurality of predetermined wheel speed values in a table each corresponding to a count value, and wherein said step of deriving includes determining said approximate wheel speed from said table.

* * * * *